United States Patent
Scheurle et al.

(10) Patent No.: US 10,018,650 B2
(45) Date of Patent: Jul. 10, 2018

(54) ROCKER DEVICE FOR A MICROMECHANICAL Z SENSOR

(71) Applicant: Robert Bosch GmbH, Stuttgart (DE)

(72) Inventors: Andreas Scheurle, Leonberg (DE); Guenther-Nino-Carlo Ullrich, Reutlingen (DE); Markus Heitz, Mount Eliza (AU); Andrea Orto, Dunavjvaros (HU)

(73) Assignee: ROBERT BOSCH GMBH, Stuttgart (DE)

( * ) Notice: Subject to any disclaimer, the term of this patent is extended or adjusted under 35 U.S.C. 154(b) by 137 days.

(21) Appl. No.: 14/614,120

(22) Filed: Feb. 4, 2015

(65) Prior Publication Data
US 2015/0233966 A1 Aug. 20, 2015

(30) Foreign Application Priority Data
Feb. 17, 2014 (DE) .................. 10 2014 202 816

(51) Int. Cl.
*G01P 15/125* (2006.01)
*G01P 15/08* (2006.01)

(52) U.S. Cl.
CPC .... *G01P 15/125* (2013.01); *G01P 2015/0831* (2013.01)

(58) Field of Classification Search
CPC ... G01P 15/125; G01P 15/0802; G01P 15/093
USPC ............................ 73/514.32, 514.36, 514.38
See application file for complete search history.

(56) References Cited

U.S. PATENT DOCUMENTS

| 4,574,327 A * | 3/1986 | Wilner ................. G01D 5/2417 338/4 |
| 5,367,425 A * | 11/1994 | Saha ..................... H02H 3/283 361/63 |
| 7,578,190 B2 * | 8/2009 | Lin ....................... G01P 15/125 73/514.29 |
| 8,079,262 B2 * | 12/2011 | Guo .................... G01P 15/0802 73/514.32 |
| 8,124,895 B2 | 2/2012 | Merassi et al. |

(Continued)

FOREIGN PATENT DOCUMENTS

| DE | 10 116 931 | 10/2002 |
| DE | 10 2007 060 878 | 6/2009 |

(Continued)

OTHER PUBLICATIONS

"Surface micromechanical sensors as electrical test structures for characterizing their manufacturing processes" [Oberflächen-mikromechanik-Sensoren als elektrische Teststrukturen zur Charakterisierung ihrer Herstellungsprozesse], Chapter 6, Maute, Matthias; Universität Tübingen, 2003.

*Primary Examiner* — Helen Kwok
(74) *Attorney, Agent, or Firm* — Norton Rose Fulbright US LLP (57) ABSTRACT

A rocker device for a micromechanical Z sensor includes: two trough-shaped rocker arms mountable around a torsion pivot, the rocker device being configured asymmetrically with respect to the torsion pivot; and for each rocker arm, a strike region having at least one first strike element is provided, the strike region on each rocker arm being configured in definedly elevated fashion relative to a sensing region of the rocker device.

24 Claims, 6 Drawing Sheets

(56) References Cited

U.S. PATENT DOCUMENTS

| | | | |
|---|---|---|---|
| 8,671,757 B2* | 3/2014 | Reinmuth | B81B 3/0051 |
| | | | 73/514.32 |
| 9,625,489 B2* | 4/2017 | Ullrich | B81B 3/0027 |
| 2005/0145029 A1* | 7/2005 | Stewart | G01P 15/0802 |
| | | | 73/514.01 |
| 2006/0169043 A1* | 8/2006 | McNeil | G01P 15/125 |
| | | | 73/514.01 |
| 2009/0031809 A1* | 2/2009 | Lin | G01P 15/125 |
| | | | 73/514.32 |
| 2009/0107238 A1* | 4/2009 | Guo | G01P 15/0802 |
| | | | 73/514.32 |
| 2010/0024553 A1* | 2/2010 | Classen | G01P 15/125 |
| | | | 73/514.32 |
| 2010/0107762 A1* | 5/2010 | Classen | G01P 15/0802 |
| | | | 73/514.24 |
| 2010/0175473 A1* | 7/2010 | Classen | G01P 15/125 |
| | | | 73/514.29 |
| 2010/0186508 A1* | 7/2010 | Guenther | G01C 25/00 |
| | | | 73/504.14 |
| 2011/0048131 A1* | 3/2011 | Reinmuth | B81B 3/0051 |
| | | | 73/504.12 |
| 2011/0056297 A1* | 3/2011 | Classen | G01P 15/125 |
| | | | 73/514.32 |
| 2012/0297879 A1* | 11/2012 | Ullrich | G01P 15/125 |
| | | | 73/514.32 |
| 2014/0143907 A1* | 5/2014 | Kim | C12N 15/8273 |
| | | | 800/289 |
| 2014/0345380 A1* | 11/2014 | Jia | B81B 3/0016 |
| | | | 73/514.32 |
| 2015/0040667 A1* | 2/2015 | Tanaka | G01P 15/125 |
| | | | 73/514.32 |
| 2015/0053002 A1* | 2/2015 | Ullrich | B81B 3/0027 |
| | | | 73/514.15 |
| 2015/0096378 A1* | 4/2015 | Kigure | G01P 15/125 |
| | | | 73/514.32 |
| 2015/0143907 A1* | 5/2015 | Ullrich | B81B 3/0051 |
| | | | 73/514.32 |
| 2016/0139172 A1* | 5/2016 | Scheurle | G01P 15/125 |
| | | | 73/514.32 |

FOREIGN PATENT DOCUMENTS

| | | |
|---|---|---|
| DE | 2009 000 167 | 7/2010 |
| DE | 10 2009 029 095 | 3/2011 |
| EP | 0 244 581 | 11/1987 |
| EP | 0 733 443 | 9/1996 |

* cited by examiner

ROCKER DEVICE FOR A MICROMECHANICAL Z SENSOR

BACKGROUND OF THE INVENTION

1. Field of the Invention

The present invention relates to a rocker device for a micromechanical Z sensor, and to a method for manufacturing a rocker device for a micromechanical Z sensor.

2. Description of the Related Art

Conventional sensors for measuring physical acceleration usually have a micromechanical structure made of silicon (sensor core) and an electronic evaluation system. Sensor cores that enable measurement of an acceleration in a direction orthogonal to a principal plane of the sensor core are referred to as "Z sensors." Such sensors are used in the motor vehicle sector, for example in ESP systems, or in the mobile telephony sector.

The aforesaid sensor principle is described in further detail, for example, in chapter 6 of the dissertation "Surface micromechanical sensors as electrical test structures for characterizing their manufacturing processes" [Oberflächen-mikromechanik-Sensoren als elektrische Teststrukturen zur Charakterisierung ihrer Herstellungsprozesse], Maute, Matthias; Universität Tübingen, 2003.

Published European patent application document EP 0 244 581 A1 discloses a micromechanical sensor for the purpose of automatic triggering of occupant protection apparatuses.

Published European patent document EP 0 773 443 B1 discloses a micromechanical acceleration sensor.

In the context of so-called "FP functionalization," which is disclosed, e.g., in Published German patent application documents DE 10 2007 060 878 A1 and DE 10 2009 000 167 A1, a rocker that is not patterned only from a single compact layer, but instead is patterned in two different silicon layers, is configured for the micromechanical acceleration sensor. Movable "trough-shaped" structures can thereby be formed.

In the context of the handling of the acceleration sensor, upon a sudden overload (for example if a control device having the acceleration sensor falls to the ground), the mass and thus the spring can be deflected in a vertical direction (i.e. out of plane). A mass of an FP function layer can thereby tear out an upper electrode, or the FP function layer itself can be destroyed.

Mechanical stops that are described, for example, in Published German patent application document DE 10 116 931 A1 are proposed in order to prevent this. The stops disclosed therein block the rocker only after approx. 7 µm to approx. 10 µm. But because, in the context of the aforesaid technology with FP functionalization, the rocker is located between the two electrodes and they are less than approx. 2 µm apart from one another, this conventional overload protection is no longer sufficient. Additional structures that are capable of stopping the rocker prior to contact have therefore been developed. Mechanical stops of this kind are disclosed in Published German patent application document DE 10 2009 029 095 A1 and U.S. Pat. No. 8,124,895 B2.

BRIEF SUMMARY OF THE INVENTION

The object of the present invention is to furnish a micromechanical Z sensor having elevated strike acceleration.

The object is achieved, according to a first aspect, with a rocker device for a micromechanical Z sensor having:

two trough-shaped rocker arms mountable around a torsion pivot, the rocker device being embodied asymmetrically with respect to the torsion pivot; and for each rocker arm, a strike region having at least one first strike element, the strike region on each rocker arm being embodied in definedly elevated fashion relative to a sensing region of the rocker device.

The elevated region of the rocker arm allows more freedom of movement, and thereby an elevated strike acceleration, to be furnished for a Z sensor having the rocker device according to the present invention. A performance capability of the micromechanical Z sensor can thereby advantageously be increased.

According to a second aspect, the object is achieved with a method for manufacturing a rocker device for a micromechanical Z sensor, having the steps of:

furnishing two asymmetrically trough-shaped rocker arms; and configuring a respective region for each rocker arm, the region having at least one first strike element and being embodied in definedly elevated fashion relative to a sensing region of the rocker device.

An advantageous refinement of the rocker device is notable for the fact that a magnitude of the elevation of the rocker device in the strike region corresponds substantially to a height of the first strike element. A movement clearance for the rocker arms in consideration of mechanical circumstances of the rocker device can thereby be optimized, so that a strike acceleration can be increased to the best possible degree.

An advantageous refinement of the rocker device is characterized in that at least one second strike element is additionally disposed for each rocker arm on the underside of the rocker device, between the first strike element and the torsion pivot. It is thereby advantageously possible to advantageously enhance a drop resistance of the entire rocker device or of the entire micromechanical Z sensor. It is thereby possible in particular to protect a sensitive transition region, between the elevated region of the rocker arms and the sensing region of the rocker device, from damage or breakage.

Favorable refinements of the rocker device provide that perforations of the rocker device are embodied as openings having rounded corners or as slit-like openings having rounded corners. Enhanced mechanical robustness of the rocker arms of the rocker device can thereby be realized, since mechanical stresses are more uniformly distributed over the material. The result is that more physical mass is made available, which can absorb more mechanical energy. It is moreover advantageously possible in this manner to furnish an elevated electrical capacitance, which can improve a sensing behavior of the Z sensor.

A further preferred embodiment of the rocker device is notable for the fact that the rocker device furthermore has at least one load relief element that is embodied in the form of a slit that penetrates through all the layers of the rocker device. The overall structure of the rocker device can in this manner be configured to be softer and more resilient, by the fact that the slit mechanically decouples individual regions of the rocker device from one another. A mechanical elasticity of the rocker device can thereby be increased, with the advantageous result that a drop resistance of the overall rocker device is further increased.

Advantageous refinements of the rocker device are notable for the fact that the slit is embodied in the region of a strike device of the rocker device and/or in a manner cutting from an edge region of the rocker device into the rocker device. Design possibilities for the slits are thereby optimally utilized, a shape and a positioning of the slits being adapted to utilization characteristics of the rocker device. The result is that elastic properties of the rocker structure can thereby advantageously be influenced.

The invention, with further features and advantages, will be described in detail below with reference to several Figures. Identical or functionally identical elements have identical reference characters. The Figures are executed qualitatively and are not to scale. Proportions and orders of magnitude therefore cannot be gathered from the Figures.

DETAILED DESCRIPTION OF THE INVENTION

Figure 1:
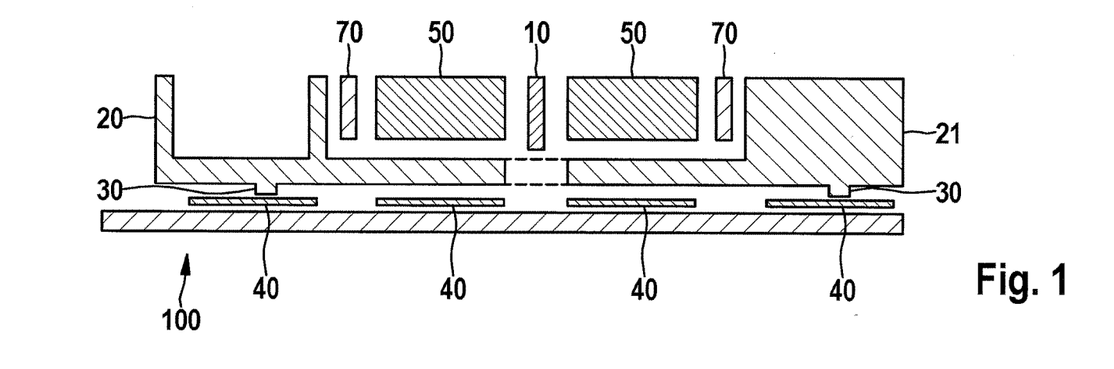
FIG. 1 is a schematic cross-sectional view of a conventional rocker device for a micromechanical Z acceleration sensor.

FIG. 1 is a highly schematic cross-sectional view showing a conventional rocker device 100 for a micromechanical Z sensor (not depicted). Two rocker arms 20, 21 are evident, which are embodied asymmetrically in terms of mass and are mounted twistably around a torsion pivot 10 that is preferably embodied as a spring device. By way of the spring device, which preferably exhibits a defined stiffness, the structure of rocker device 100 is mounted rotatably or twistably on a silicon substrate or suspended thereon. Disposed below each rocker arm 20, 21 are knob-like strike elements 30, made of the material of rocker arm 20, 21, by way of which rocker arms 20, 21 can impinge upon electrodes 40 in the context of a stipulated vertical acceleration. An acceleration value at which these strike elements 30 strike electrodes 40 is called a "strike acceleration" and represents an important operating parameter for micromechanical Z sensors. At the aforesaid strike acceleration, strike element 30 strikes electrode 40 in controlled fashion. The higher the aforesaid strike acceleration, the better the operating characteristics of the Z sensor can be.

A perforation (not depicted), embodied in a Z direction, of rocker device 100 is present for manufacturing reasons as a result of etching processes, and substantially completely covers the rocker region.

It is evident that rocker arms 20, 21 are embodied asymmetrically with respect to spring device 10 due to unequal mass distributions. In a context of rocker arms 20, 21 of substantially identical length (geometric symmetry), the asymmetry can be embodied as an asymmetrical mass distribution of rocker arms 20, 21, for example as a result of different perforations of arms 20, 21 or different thicknesses of the two rocker arms 20, 21. The asymmetry can, however, also additionally or alternatively be achieved by way of an asymmetry of the two rocker arms 20, 21 (e.g. different arm lengths).

In FIG. 1 the aforesaid asymmetry is indicated by way of different masses for the two rocker arms 20, 21 (high-mass rocker arm 21, low-mass rocker arm 20). As a consequence of an acceleration acting orthogonally to a principal plane of rocker device 100 (vertical acceleration), the structure of rocker device 100 can twist around torsion axis 10 because of the asymmetry of the two rocker arms 20, 21. Rocker device 100 is held by an electronic circuit (not depicted) at a defined electrical potential; stationary electrodes 40, which are disposed below rocker device 100 and are used for measurement purposes, are held at different defined electrical potentials. "Trough-shaped" structures of rocker device 100 are evident, stationary electrodes 50 being disposed above the trough-shaped structures.

A change in the inclination of rocker device 100 is detected with the aid of an electronic evaluation device (not depicted) by sensing and evaluating charge changes on electrodes 40, 50. A vertical acceleration (in the "Z direction") acting on the micromechanical Z sensor can thereby be ascertained.

In order to implement the trough-shaped structures of rocker arms 20, 21, an overall structure of rocker device 100 is as a rule implemented from three functional layers (not depicted), namely an upper first functional layer ("EP" layer), a second functional layer ("OK" layer) arranged between the EP layer and a third functional layer ("FP" layer), and the lower FP layer. The OK layer can also be omitted if necessary.

Several mechanical abutments 70 (called "stirrups") are provided in the substrate such that in the context of an overload the rocker structure strikes the substrate at defined points, and are intended to prevent rocker structure 100 from reaching or exceeding a critical deflection in the context of lateral ("in-plane") overload accelerations.

Figure 2:
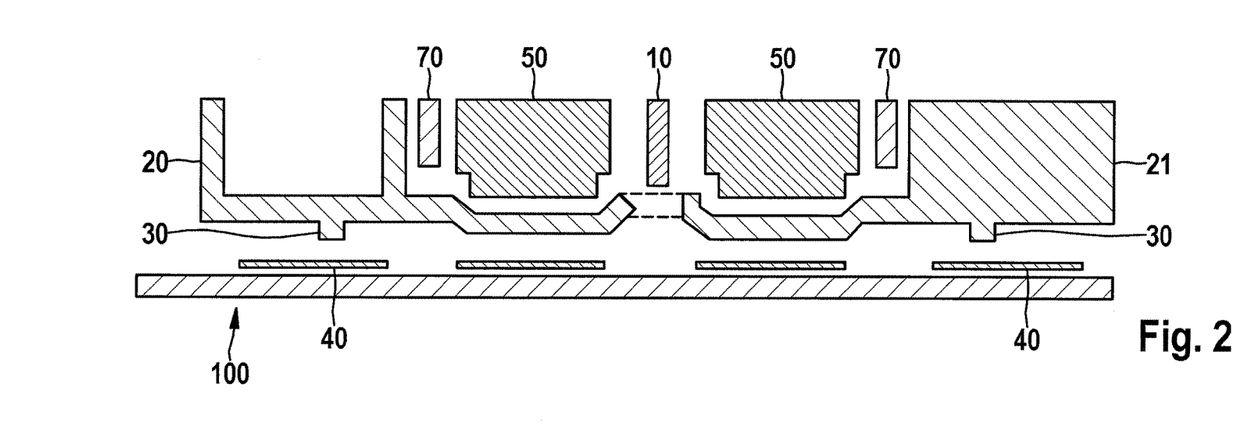
FIG. 2 shows a first embodiment of a rocker device according to the present invention for a micromechanical Z acceleration sensor.

FIG. 2 is a schematic cross-sectional view showing a first embodiment of rocker device 100 according to the present invention. It is evident that a respective external region of each rocker arm 20, 21 is embodied in raised or definedly elevated fashion as compared with a region located internally at torsion pivot 10. The result is that rocker arms 20, 21 have a greater geometric movement clearance in a vertical working direction, and can thereby strike electrodes 40 disposed therebelow with an advantageously elevated strike acceleration. The advantageous result of the partial raising of rocker arms 20, 21 is thus an elevated strike acceleration and therefore favorable utilization characteristics for the micromechanical Z sensor.

An underside of electrodes 50 is preferably also adapted to the trough structure of the depressed regions of rocker arms 20, 21.

Figure 3:
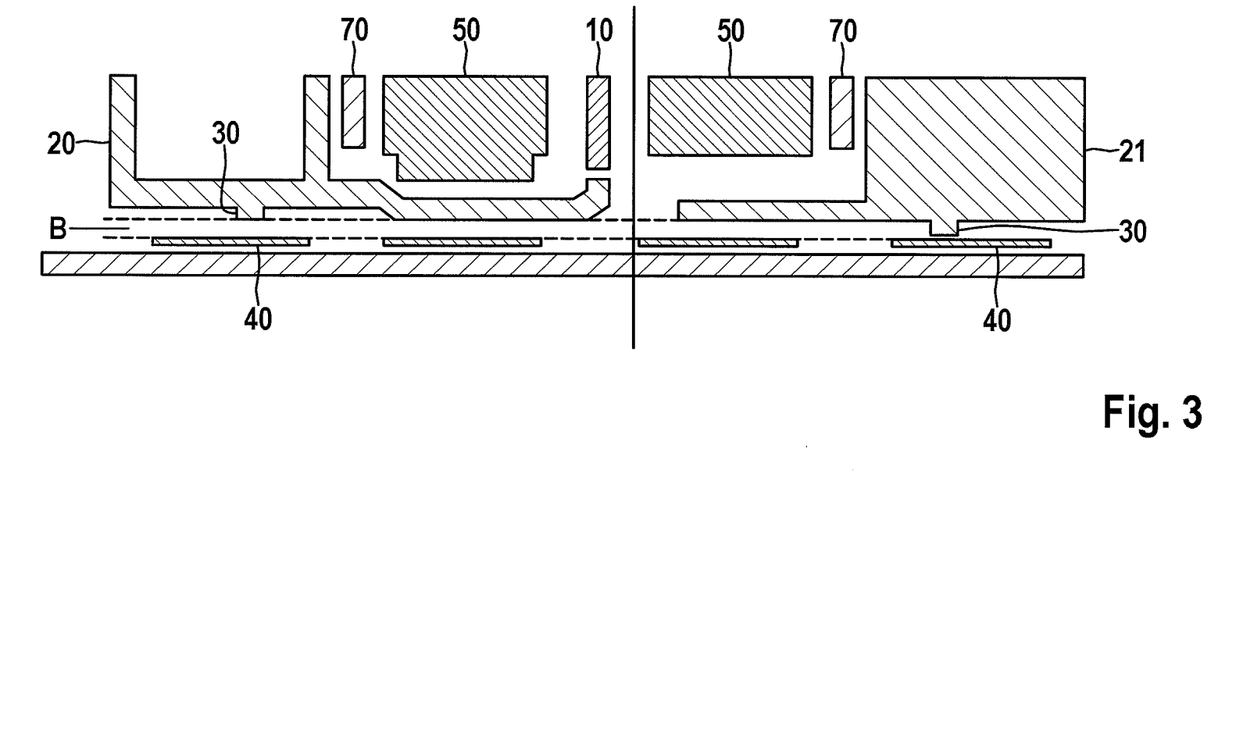
FIG. 3 is a schematic comparison of the conventional rocker device with an embodiment of the rocker device according to the present invention.

FIG. 3 shows a comparison between a plan view of an embodiment of rocker device 100 according to the present invention and a plan view of a conventional rocker device 100. For illustration, only the two rocker arms 21 are shown, the embodiment of rocker arm 21 according to the present invention being depicted on the left and the conventional embodiment of rocker arm 21 on the right. It is apparent that as compared with the conventional rocker device 100, rocker device 100 according to the present invention exhibits an elevated freedom of movement B in the Z direction, resulting in an elevated strike acceleration for the micromechanical Z sensor device.

Figure 4:
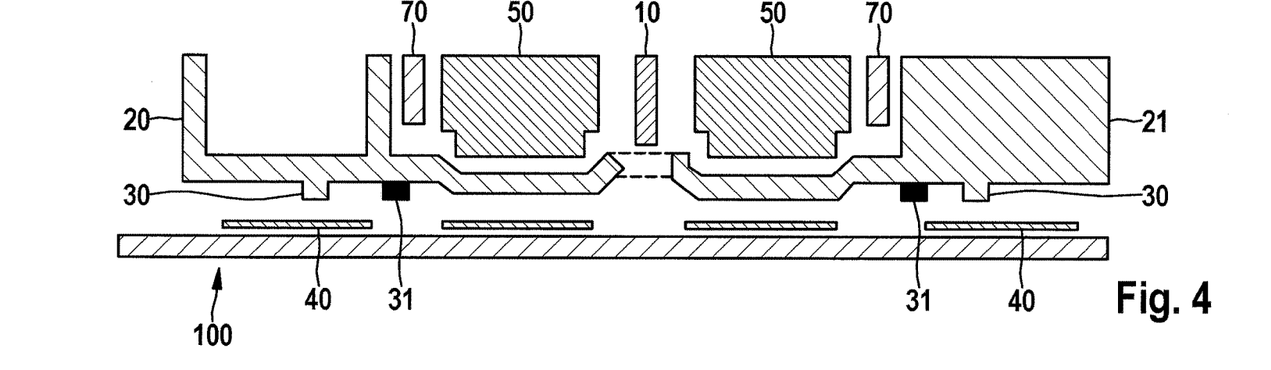
FIG. 4 is a cross-sectional view of a further embodiment of the rocker device according to the present invention.

FIG. 4 is a cross-sectional view of a further embodiment of rocker device 100. It is evident that additional strike elements 31, which are intended to protect the mechanically sensitive transition region between the elevated regions of rocker arms 20, 21 and the depressed trough structures of rocker arms 20, 21 upon a hard impact, are disposed on the underside of rocker arms 20, 21 between first strike elements 30 and torsion pivot 10.

For this purpose, the additional knob-like strike elements 31 are preferably configured to be substantially of the same height as the elevation of rocker arms 20, 21. A height of the knob-like strike elements 30, 31 is approximately 20 µm. Additional strike elements 31 can be distributed in any quantity over the lower surface of rocker arms 20, 21 so that requirements in terms of strike or impact are optimally accounted for. The advantageous result of the additional strike elements 31 is thus to promote an increased impact resistance of the overall rocker device 100. Although in FIG. 4 additional strike elements 31 are disposed close to strike elements 30, it can preferably be favorable to dispose strike elements 30 and 31 with an appreciable spacing from one another.

Figure 5:
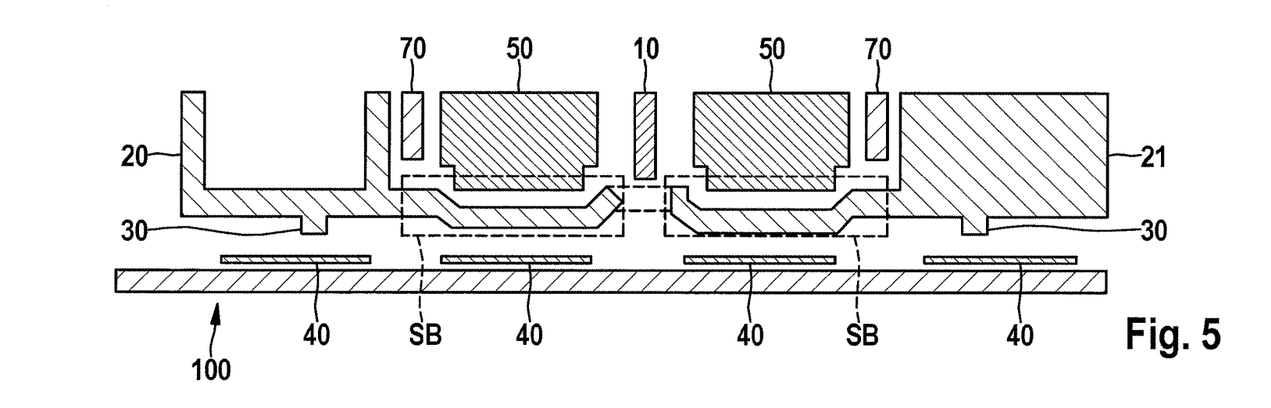
FIG. 5 schematically indicates an electrode region or sensor region of the embodiment of FIG. 4 of the rocker device according to the present invention.

FIG. 5 shows sensing regions or electrode regions SB (indicated with cross-hatching) of rocker device 100, in which regions capacitance changes of electrodes 40, 50 are sensed and in which a subsequently described advantageous configuration of a perforation of rocker arms 20, 21 is implemented.

Figure 6A:
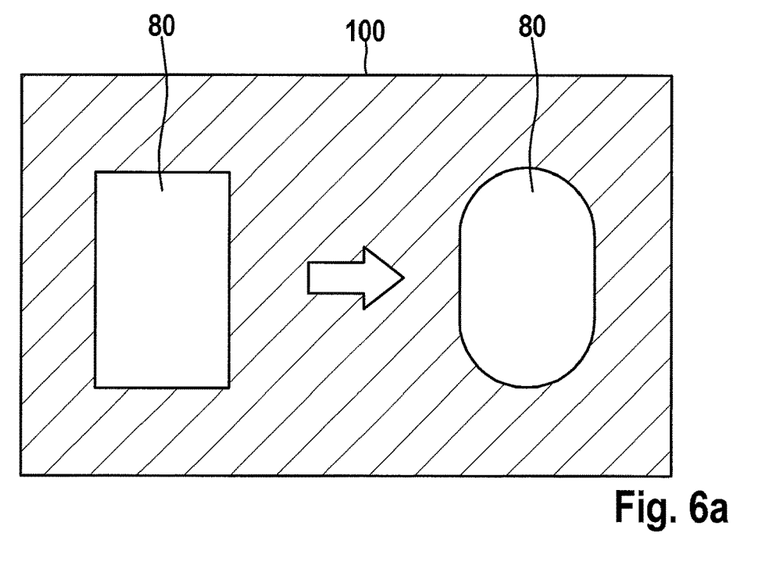
FIGS. 6a and 6b are two detail views of an embodiment of the rocker device according to the present invention.
Figure 6B:
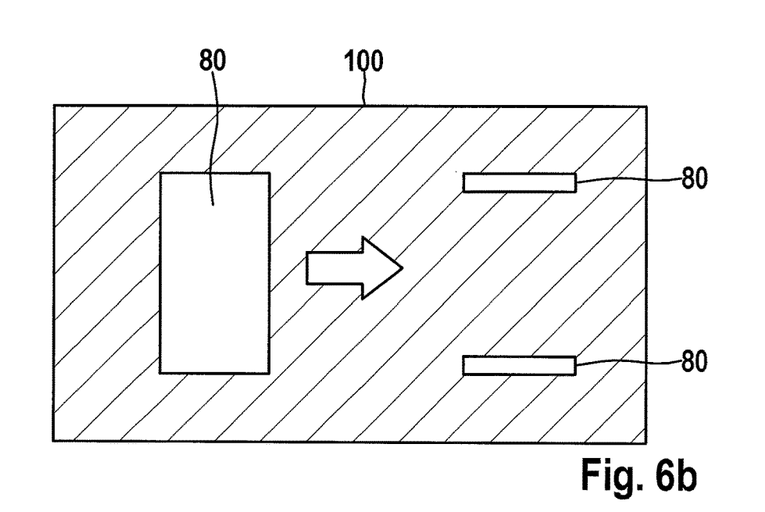

FIG. 6a is a plan view of a first form of an improved vertical perforation of rocker arms 20, 21. It is evident that the conventional polygonal structures of perforation holes 80 (left illustration) are substantially replaced with openings having rounded corners (right illustration). Better transfer of a mechanical load to the material of rocker arm 20, 21 is thereby possible. FIG. 6b depicts, in the right illustration, a further variation of perforation holes 80; it is evident that in this case the rectangular perforation holes 80 are replaced by small slit-like perforation holes 80, the corners being embodied in rounded fashion in this case as well.

As a result, a decrease in the repercussions of the physical notch effect is achieved with the aforesaid specific embodiment of perforation holes 80. The improved perforation holes 80 can preferably be disposed entirely or partly in regions of rocker device 100 in which rocker device 100 is more heavily loaded. Favorable dimensions for the aforesaid perforation holes 80 are on the order of approx. 0.5 µm by approx. 4 µm.

Improved energy distribution within rocker arms 20, 21 is advantageously achieved with the structures of the improved vertical perforation holes 80 of FIGS. 6a and 6b. The elevated stiffness, associated therewith, of rocker arms 20, 20 [sic: 21] can be counteracted relatively simply with an enlarged configuration of rocker arms 20, 21. The structures of the improved perforation holes 80 of FIGS. 6a and 6b can be embodied in rocker arms 20, 21 both separately and in mixed fashion.

Figure 7:
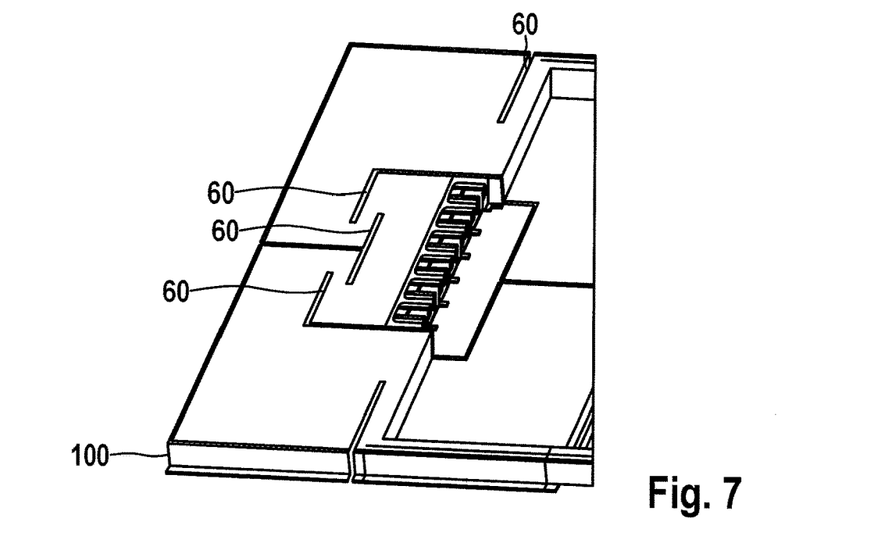
FIG. 7 is a perspective detail view of an embodiment of the rocker device according to the present invention.

FIG. 7 shows a further measure for improved absorption of mechanical striking energy for rocker device 100. For this, multiple load relief elements 60 are provided, in the form of narrow slits that are configured through all the layers of rocker device 100 and serve to make rocker device 100 as a whole even more elastic.

Load relief elements 60 additionally serve to reduce the stiffness of rocker device 100 in order thereby to allow the absorption of deformation energy. The slits are intended to influence the deformation of rocker device 100 in such a way that rocker device 100 is stressed as uniformly as possible in the region of a possible impact. It is thereby possible to absorb impact energy even better by way of specific conformations or dispositions of slits 60 within rocker device 100, since individual regions of rocker device 100 are thereby mechanically decoupled from one another, and mechanical stresses within rocker device 100 are thereby advantageously reduced.

Figure 8:
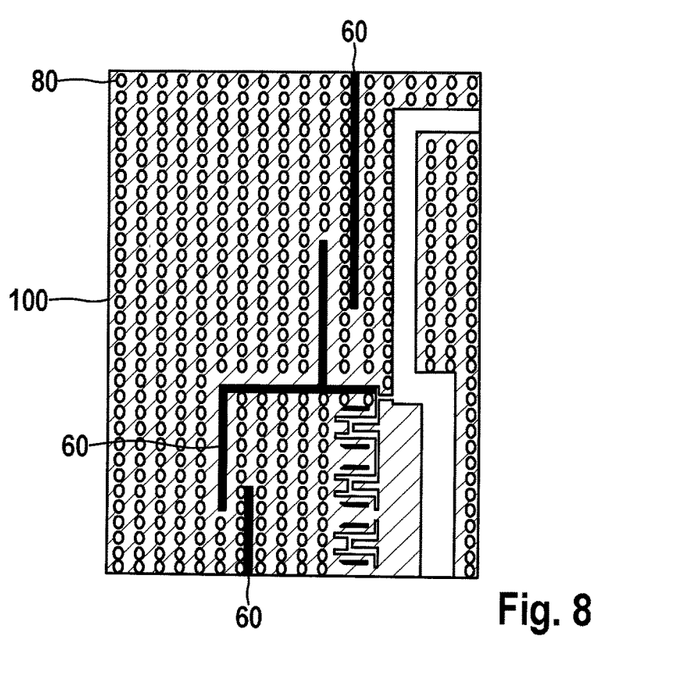
FIG. 8 is a detail view of a further embodiment of the rocker device according to the present invention.

FIG. 8 shows multiple assemblages of such slits 60 in rocker device 100; it is apparent that a shape of slits 60 can be configured very flexibly. Provision can be made, for example, to embody the slots so they extend into one another and/or to embody them to cut into rocker device 100 from the edge region of rocker device 100. In merely qualitative fashion, a plurality of perforation holes 80 is also depicted in FIG. 8.

Be it noted at this juncture that a number and a disposition of strike elements 30 and 31, of perforation holes 80, and of load relief elements 60 are arbitrarily variable, so that a desired effect of the aforesaid elements can be optimally adapted, by way of simulation processes, to a rocker device 100. The number and positioning of the aforesaid elements 30, 31, 80, 60 are preferably adapted to a geometry or a design of rocker device 100. All numbers, dimensions, and dispositions of the aforesaid elements in the Figures are therefore to be regarded as being merely exemplifying and depicted in qualitative fashion.

Figure 9:
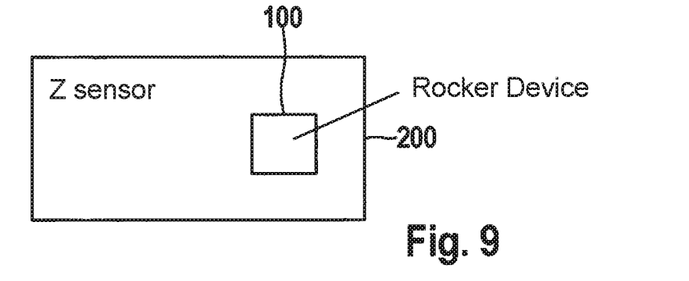
FIG. 9 is a block diagram of a micromechanical Z sensor having the rocker device according to the present invention.

FIG. 9 shows, merely qualitatively, a block diagram of a micromechanical Z sensor 200 having an embodiment of rocker device 100 according to the present invention.

Figure 10:
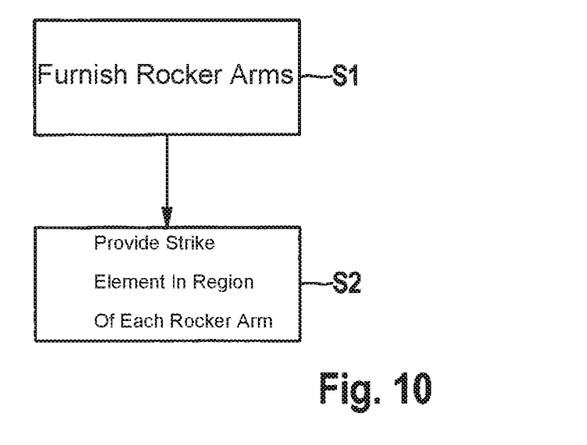
FIG. 10 is a schematic flow chart of an embodiment of the method according to the present invention.

FIG. 10 is a schematic flow chart of an embodiment of the method according to the present invention.

In a first step S1, two asymmetrical rocker arms 20, 21 of trough-like configuration are furnished.

In a step S2, an embodiment of one region per rocker arm 20, 21 is carried out in such a way that the region has at least one first strike element 30 and is embodied in definedly elevated fashion relative to a sensing region SB of rocker device 100.

In summary, the present invention makes available a rocker device for a micromechanical Z sensor which enables an elevated strike acceleration and thus improved performance of the Z sensor. This objective can be achieved in simple fashion by way of an elevated disposition of outer regions of the rocker arms.

Although the invention has been described with reference to specific embodiments, it is in no way limited thereto. One skilled in the art will recognize that many variations, which have been described in the present case only partly or not at all, are possible without deviating from the essence of the invention. In particular, it is also advantageously possible to apply the principle of the present invention to other sensor technologies, for example to piezoresistive micromechanical acceleration sensors.

What is claimed is:

1. A rocker device for a micromechanical Z sensor, comprising:
   two trough-shaped rocker arms mounted around a torsion pivot, the rocker device being embodied asymmetrically with respect to the torsion pivot, wherein each rocker arm includes a strike region having at least one first strike element, the strike region on each rocker arm being embodied in definedly elevated fashion relative to a sensing region of the rocker device;

a stationary electrode that is aligned with and situated inside a cavity of a trough of the rocker arms, wherein no portion of the stationary electrode is joined to any surface of the trough; and a further stationary electrode that is located below the stationary electrode situated in the trough, wherein:
a bottom of the trough includes at least first, second, and third surfaces,
the second surface is disposed between the first and second surfaces, and
the second surface is located closer to the further stationary electrode than the first and third surfaces.

2. The rocker device as recited in claim 1, wherein a magnitude of the elevation of the rocker device in the strike region corresponds substantially to a height of the first strike element.

3. The rocker device as recited in claim 1, wherein perforations are provided in the rocker device, and wherein the perforations of the rocker device are embodied as openings having rounded corners.

4. The rocker device as recited in claim 3, wherein the openings are of slit-like configuration.

5. The rocker device as recited in claim 1, further comprising:
at least one load relief element configured in the form of a slit which penetrates through an entire thickness of the rocker device.

6. The rocker device as recited in claim 5, wherein the load relief element is configured at least one of: (i) in the region of the first strike element of the rocker device; and (ii) in a manner cutting from an edge region of the rocker device into the rocker device.

7. A method for manufacturing a rocker device for a micromechanical Z sensor, comprising:
providing two asymmetrically trough-shaped rocker arms mounted around a torsion pivot,
configuring a respective region for each rocker arm, the respective region having at least one first strike element and being embodied in definedly elevated fashion relative to a sensing region of the rocker device;
providing a stationary electrode that is aligned with and situated inside a cavity of a trough of the rocker arms wherein no portion of the stationary electrode is joined to any surface of the trough; and
providing a further stationary electrode that is located below the stationary electrode situated in the trough, wherein:
a bottom of the trough includes at least first, second, and third surfaces,
the second surface is disposed between the first and second surfaces, and
the second surface is located closer to the further stationary electrode than the first and third surfaces.

8. The method as recited in claim 7, wherein at least one load relief element is provided for each rocker arm in the region of the first strike element, the load relief element being embodied as a slit penetrating through an entire thickness of the rocker device.

9. The rocker device as recited in claim 1, wherein at least one second strike element is additionally disposed for each rocker arm on an underside of the rocker device, between the first strike element and the torsion pivot and at a transition region between an elevated region of the rocker arms and a depressed trough structures of the rocker arm.

10. The method as recited in claim 7, further comprising providing at least one second strike element for each rocker arm on an underside of the rocker device, between the first strike element and the torsion pivot and at a transition region between an elevated region of the rocker arms and a depressed trough structures of the rocker arm.

11. The rocker device as recited in claim 1, wherein the rocker arms are equal in length to one another in a plane that intersects the torsion pivot and have an asymmetric mass distribution with respect to one another.

12. The method as recited in claim 7, wherein:
the rocker arms are equal in length to one another in a plane that intersects the torsion pivot and have an asymmetric mass distribution with respect to one another.

13. The rocker device as recited in claim 1, further comprising:
a plurality of abutments located above the rocker arms, wherein the abutments prevent the rocker arms from exceeding a critical deflection in a lateral direction.

14. The method as recited in claim 7 further comprising:
providing a plurality of abutments located above the rocker arms, wherein the abutments prevent the rocker arms from exceeding a critical deflection in a lateral direction.

15. The rocker device as recited in claim 1, wherein the rocker arm is located between the further stationary electrode and the stationary electrode situated in the trough.

16. The method as recited in claim 7, wherein the rocker arm is located between the further stationary electrode and the stationary electrode situated in the trough.

17. The rocker device as recited in claim 1, wherein:
the stationary electrode located in the cavity of the trough is located over the second surface of the trough.

18. The rocker device as recited in claim 17, wherein:
a bottom surface of the stationary electrode located in the cavity is closer to the further stationary electrode that the first and second surfaces of the trough.

19. The rocker device as recited in claim 1, wherein:
the first and third surfaces of the trough are coplanar to one another and parallel to the second surface.

20. The rocker device as recited in claim 1, wherein:
the first and third surfaces of the trough each extend respectively at a non-zero and non-perpendicular angle from the second surface of the trough.

21. The method as recited in claim 7, wherein:
the stationary electrode located in the cavity of the trough is located over the second surface of the trough.

22. The method as recited in claim 21, wherein:
a bottom surface of the stationary electrode located in the cavity is closer to the further stationary electrode that the first and second surfaces of the trough.

23. The method as recited in claim 7, wherein:
the first and third surfaces of the trough are coplanar to one another and parallel to the second surface.

24. The method as recited in claim 7, wherein:
the first and third surfaces of the trough each extend respectively at a non-zero and non-perpendicular angle from the second surface of the trough.

* * * * *